United States Patent [19]

Kawashimo et al.

[11] Patent Number: 4,539,641
[45] Date of Patent: Sep. 3, 1985

[54] DATA PROCESSOR IN AUTOMOBILES

[75] Inventors: Norishige Kawashimo, Kodaira; Joe Nakajima, Mitaka, both of Japan

[73] Assignee: Hitachi, Ltd., Tokyo, Japan

[21] Appl. No.: 361,477

[22] Filed: Mar. 23, 1982

[30] Foreign Application Priority Data

Mar. 23, 1981 [JP] Japan .................................. 56-40303

[51] Int. Cl.³ ............................................. G01C 22/00
[52] U.S. Cl. .................................. 364/424; 364/550; 364/561
[58] Field of Search ................ 364/424, 550, 551, 561

[56] References Cited

U.S. PATENT DOCUMENTS

| | | | |
|---|---|---|---|
| 3,780,272 | 12/1973 | Rohner | 364/424 |
| 4,053,749 | 10/1977 | Shinoda et al. | 364/561 X |
| 4,072,850 | 2/1978 | McGlynn | 364/424 |
| 4,184,205 | 1/1980 | Morrow | 364/550 X |
| 4,250,402 | 2/1981 | Mizote et al. | 377/24 |
| 4,258,421 | 3/1981 | Juhasz et al. | 340/870.16 X |
| 4,371,934 | 2/1983 | Wahl et al. | 364/424 |
| 4,400,783 | 8/1983 | Locke, Jr. et al. | 364/550 X |
| 4,409,663 | 10/1983 | Becker et al. | 364/424 X |

Primary Examiner—Errol A. Krass
Assistant Examiner—Edward R. Cosimano
Attorney, Agent, or Firm—Antonelli, Terry & Wands

[57] ABSTRACT

A data handling system for an automobile comprises an odometric data generator which provides odometric data corresponding to the travel distance of the automobile. A nonvolatile memory stores total odometric data, an adder receives the odometric data provided from the odometric data generator and the previous total odometric data provided from the nonvolatile memory, and a control circuit controls the writing of data into the nonvolatile memory in accordance with the state of a key switch. The adder receives the present odometric data and the previous odometric data, to thereby provide total odometric data up to the present time. This total odometric data is displayed by an appropriate display device. In response to the turn-off of the key switch, the total odometric data provided from the adder is written into the nonvolatile memory. Thus, an odometer can be implemented in electronic circuit form.

10 Claims, 6 Drawing Figures

DATA PROCESSOR IN AUTOMOBILES

FIELD OF THE INVENTION

The present invention relates to a transit data memorizing and displaying device in, for example, automobiles.

BACKGROUND OF THE INVENTION

In automobiles, the number of revolutions of a propeller shaft such as the output shaft of a transmission thereof is integrated (counted) and stored as odometric data by a total odometer and a trip odometer, the latter being disposed as may be needed. A known total odometer or trip odometer is constructed of a mechanical counter which has a data display portion in the shape of a rotary drum.

Each of such mechanical total and trip odometers is comprised of comparatively large mechanical parts which are ordinarily disposed at the rear surface of the instrument panel. It is, therefore, difficult to make the instrument panel etc. small in size. On account of the comparatively large mechanical parts disposed at the rear surface of the instrument panel, arrangement of an instruction display portion cannot be easily varied. It is, consequently, difficult to condense the instruction display portion.

SUMMARY OF THE INVENTION

It is, accordingly, an object of this invention to provide a transit data memorizing and displaying device for automobiles by way of which the size and arrangement of the instrument panel can be reduced and condensed.

Another object of this invention is to provide a novel transit data memorizing and displaying device for automobiles which permits the electronic packaging of meters.

Another object of this invention is to provide transit data memorizing and displaying device which can provide accurate display data.

Further objects of this invention will become apparent from the following description taken in conjunction with the drawings.

DESCRIPTION OF THE PREFERRED EMBODIMENTS

Figure 1:
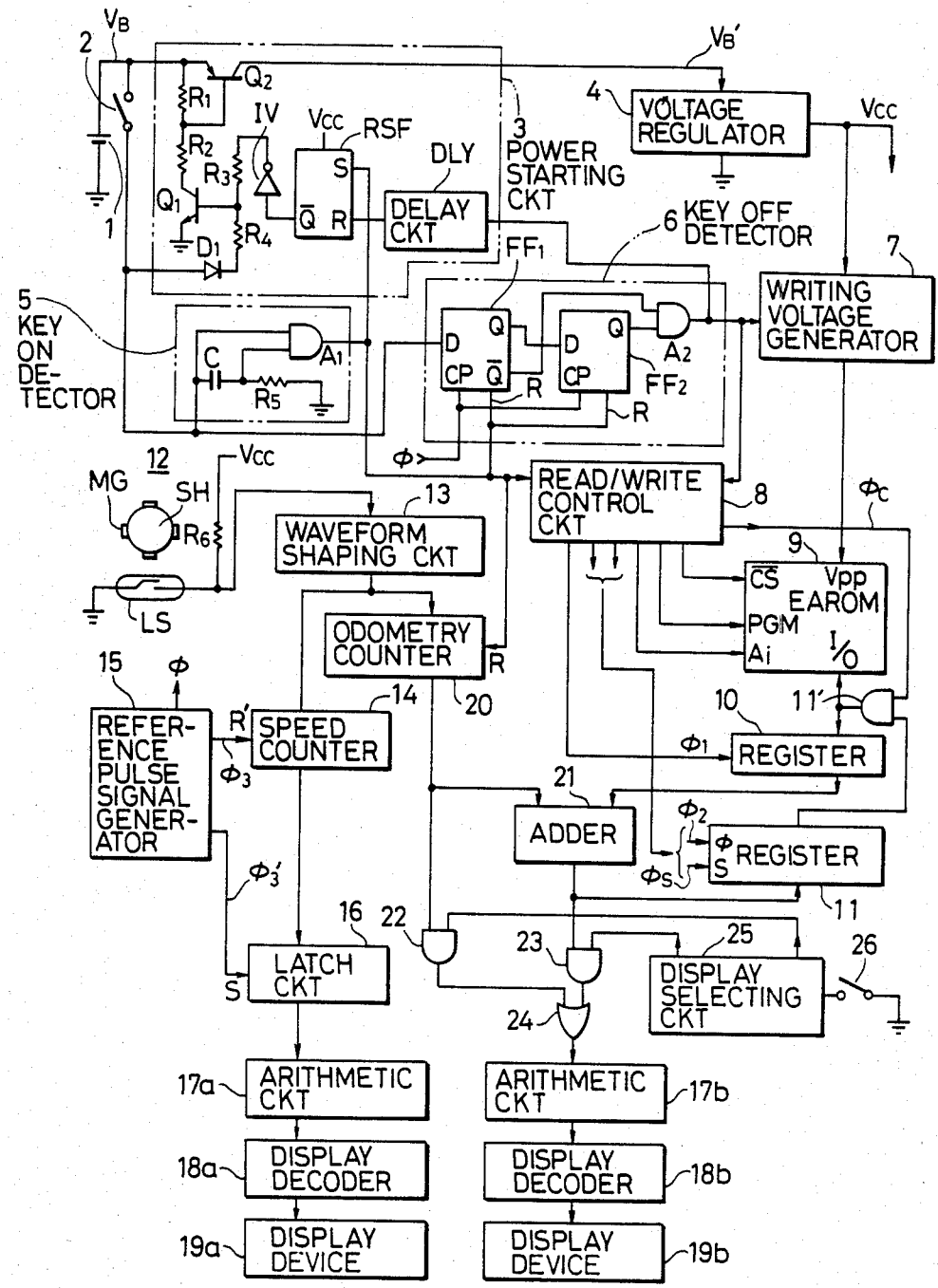
FIG. 1 is a circuit diagram of an embodiment of this invention.

FIG. 1 shows a circuit diagram of an embodiment of this invention. Referring to the figure, there are shown a battery 1, a key switch 2, a power starting circuit 3, a voltage regulator 4, a key-on detector 5, and a key-off detector 6.

As shown in the figure, the power starting circuit 3 is constructed of a p-n-p bipolar transistor $Q_2$ serving as a power switch, an n-p-n bipolar transistor $Q_1$ for control, a diode $D_1$ for preventing reverse current, an inverter circuit IV serving as a buffer amplifier, a reset-set flip-flop circuit RSF for holding or storing a level representative of an operation, a delay circuit DLY, and resistors $R_1$ to $R_4$. Although not especially restricted, the flip-flop circuit RSF and the inverter circuit IV are supplied with the output voltage $V_{CC}$ of the voltage regulator 4 as a supply voltage.

Where the key switch 2 is in the "off" state or open, the controlling n-p-n bipolar transistor $Q_1$ is in the "off" state, and the p-n-p bipolar transistor $Q_2$ is accordingly in the "off" state. Therefore, the power of the battery 1 is not dissipated. Where the key switch 2 is turned "on" or closed, the controlling n-p-n bipolar transistor $Q_1$ has its base supplied with a bias current from the battery 1 through this key switch 2, the diode $D_1$ and the resistor $R_4$ and is therefore turned "on".

The "on" state of the controlling n-p-n bipolar transistor $Q_1$ turns p-n-p bipolar transistor $Q_2$ "on". The voltage regulator 4 is supplied with a battery voltage through the p-n-p bipolar transistor $Q_2$. As a result, the voltage regulator 4 provides a voltage $V_{CC}$ which serves as a supply voltage to be fed to various circuits described later. Although not especially restricted, the electromotive force of the battery 1 has a value of 12 volts and the voltage $V_{CC}$ has a value of 5 volts.

As shown in the figure, the key-on detector 5 is constructed of an AND circuit $A_1$, and a capacitor C and resistor $R_5$ which constitute a differentiator circuit. It provides a signal of high level (logic value "1") for the period of time which is determined by the time constant of capacitor C and resistor $R_5$, when the key switch 2 has been turned "on". The flip-flop circuit RSF in the power starting circuit 3 is brought into its operative state by the voltage $V_{CC}$ delivered from the voltage regulator 4. This circuit RSF is set by the high level signal supplied from the key on detector 5 upon the turn-on of the switch 2, to provide its inverting output terminal Q $\overline{Q}$ with a low level signal (logic value "0") being, for example, substantially equal to the ground potential. Upon receiving the low-level output signal of the flip-flop circuit RSF, the inverter circuit IV provides a high level signal. As a result, the controlling n-p-n bipolar transistor $Q_1$ has its base supplied with a bias current through the resistor $R_3$ and is turned "on" irrespective of the switching state of the key switch 2. Where the key switch 2 is turned from the "on" state into the "off" state, a signal which is held at the high level for a predetermined period of time since the "off" state of the key switch 2 has been established is provided from the key-off detector 6.

The delay circuit DLY in the power starting circuit 3 provides a signal which is delayed a predetermined time with respect to the output signal of the key off detector 6. The flip-flop circuit RSF is reset by the output signal of the delay circuit DLY. As a result, the bipolar transistors $Q_1$ and $Q_2$ in the power starting circuit 3 are turned "off" upon the expiration of a predetermined time after the key switch 2 has been turned "off". According to this embodiment, as will be understood from the description below, data having been generated during the "on" state of the key switch 2 is written into an electrically alterable semiconductor nonvolatile memory (hereinbelow, simply termed "semiconductor nonvolatile memory") 9 when the key switch 2 has turned "off". Therefore, the aforecited delay time is made longer than the period of time which is required for writing data into the memory 9.

Although not especially restricted, the key-off detector 6 is constructed of delay flip-flop circuits $FF_1$ and $FF_2$ and an AND circuit $A_2$, as shown in the figure. The clock terminals CP of the delay flip-flop circuits $FF_1$ and $FF_2$ are supplied with a clock pulse signal $\phi$ from a reference pulse signal generator 15 to be described later. Each of the delay flip-flop circuits $FF_1$ and $FF_2$ is constructed, by way of example, so that a signal supplied to its data input terminal D is received in synchronism with the fall of the clock pulse $\phi$ and so that the received signal is delivered to its noninverting output terminal Q and inverting output terminal $\overline{Q}$ in synchronism with the rise of the clock pulse $\phi$.

In order to prevent the AND circuits $A_2$ from providing an erroneous signal upon closure of the key switch 2, the delay flip-flop circuits $FF_1$ and $FF_2$ are held in the same state by the output of the key-on detector 5. In the illustrated case, the delay flip-flop circuits $FF_1$ and $FF_2$ are held in the reset state in such a way that their reset terminals R are coupled to the output terminal of the key-on detector 5. The data input terminal D of the delay flip-flop circuit $FF_1$ is coupled to the battery 1 through the key switch 2, so that its level is determined by the switching state of the key switch 2.

With the above construction, the output terminals Q of the delay flip-flop circuits $FF_1$ and $FF_2$ are successively brought to a high level in accordance with the clock pulse signal $\phi$ after the closure of the key switch 2, and they are thereafter held at the high level as long as the key switch is maintained in the "on" state. Where the key switch 2 is brought from the "on" state into the "off" state, the output terminals Q of the delay flip-flop circuits $FF_1$ and $FF_2$ are successively at a low level in accordance with the clock pulse signal $\phi$. As a result, the key-off detector 6 provides an output signal at a high level for the period of time equal to one cycle of the clock pulse signal $\phi$, since the key switch 2 has been turned "off".

Numeral 7 indicates a writing voltage generator whose operation is controlled by the output of the key-off detector 6. It is employed for energizing the semiconductor nonvolatile memory 9 which requires a writing voltage of a comparatively high level such as +25 volts in a data writing or data programming mode. The writing voltage generator 7 is arranged so as to provide the aforecited writing voltage in response to the fact that the output signal of the key-off detector 6 has been made a high level, and to provide a voltage at a level substantially equal to the voltage $V_{CC}$ or ground potential while the output signal of the key-off detector 6 is held low.

Numeral 8 indicates a read/write control circuit which is controlled by the output signal of the key-on detector 5 or the key-off detector 6. This read/write control circuit 8 is arranged so that, when controlled by the output of the key-on detector 5, it provides signals to be supplied to the chip select terminal $\overline{CS}$ and address input terminals $A_i$ of the semiconductor nonvolatile memory 9 and a clock pulse signal $\phi_1$ to be supplied to a serial-parallel converting register 10 for a predetermined period of time.

The read/write control circuit 8 is also arranged so that, when controlled by the output of the key-off detector 6, it provides signals to be supplied to the chip select terminal $\overline{CS}$ program terminal PGM and address input terminals $A_i$ of the semiconductor nonvolatile memory 9 and a clock pulse signal $\phi_2$ to be supplied to a parallel-serial converting register 11 for a predetermined period of time.

The semiconductor nonvolatile memory 9 stores odometric data of an automobile. This semiconductor nonvolatile memory 9, per se, is known and includes a plurality of memory cells constructed of nonvolatile memory elements capable of electrically writing and electrically erasing data, for example, MNOS (Metal Nitride Oxide Semiconductor) elements. Although not especially restricted, the semiconductor nonvolatile memory 9 is arranged so as to receive the output voltage $V_{CC}$ of the voltage regulator 4 as its supply voltage.

The semiconductor nonvolatile memory 9 has a suitable internal arrangement. As a result, the data of the memory cell selected by the address signals supplied to the plurality of address input terminals $A_i$ is supplied to the data input/output terminal I/0 of the memory 9 in response to the fact that the chip select terminal $\overline{CS}$ goes low (substantially equal to the ground potential), in other words, in the chip select state, and irrespective of the levels of the terminals $V_{PP}$ and PGM of the memory 9.

While the chip select terminal $\overline{CS}$ is held high (substantially equal to the level $V_{CC}$), the writing voltage input terminal $V_{PP}$ is held at the writing voltage level substantially equal to +25 volts. In addition, when the program terminal PGM goes ($V_{CC}$), the data supplied to the data input/output terminal I/0 is written into the selected memory cell.

Although not especially restricted, the data unit which is stored in the semiconductor nonvolatile memory 9 is composed of a comparatively small number of bits, for example, 1 bit. On the other hand, the odometric data of the automobile is composed of ten or more bits. Therefore, the odometric data is stored over a plurality of memory addresses in the semiconductor nonvolatile memory 9.

Upon the closure of the key switch 2, the key on detector 5 responds thereto to provide a detection signal, which starts the read/write control circuit 8. Upon starting, the read/write control circuit 8 provides the chip select signal of a low level and subsequently provides a plurality of address signals for scanning the respective addresses of the semiconductor nonvolatile memory 9. In response to the plurality of address signals, odometric data which have been stored over the plurality of addresses of the semiconductor nonvolatile memory 9 in advance are serially read out in succession. The read/write control circuit 8 also provides the serial-parallel converting clock pulses $\phi_1$ in synchronism with the respective address signals. Accordingly, the data provided from the semiconductor nonvolatile memory 9 are applied to and held in the serial-parallel converting register 10.

After a predetermined number of address signals have been provided, the read/write control circuit 8 is disabled. Upon opening the key switch 2, the key-off detector 6 responds to the opening to provide a detection signal, by which writing voltage generator 7 is operated and the read/write control circuit 8 is restarted.

Upon starting, the read/write control circuit 8 first provides a setting clock pulse signal $\phi_s$, in response to which the present odometric data being provided from an adder 21 to be described later is set into the parallel-serial converting register 11 functioning as a memory. After having provided the clock pulse signal $\phi_s$, the read/write control circuit 8 provides a plurality of parallel-serial converting clock pulses $\phi_2$. In synchronism with the clock pulses $\phi_2$, the parallel-serial converting register 11 serially provides the data set therein.

The read/write control circuit 8 provides a control clock pulse signal $\phi_c$ which is held high during the period of the restarted state, and in response to which an AND circuit 11' is enabled. Accordingly, the serial output data of the parallel-serial converting register 11 are supplied to the data input/output terminal I/0 of the semiconductor nonvolatile memory 9 through the AND circuit 11'.

The read/write control circuit 8 further provides the program signal which goes high in synchronism with the clock pulse signal $\phi_2$, and the plurality of address signals which serve to scan the plurality of addresses of the semiconductor nonvolatile memory 9. In this case, the writing voltage input terminal $V_{PP}$ of the semiconductor nonvolatile memory 9 is supplied with a writing voltage of, for example, +25 volts owing to the fact that the writing voltage generator 7 is in the operated state as described above. Under the control of the read/write control circuit 8, accordingly, the serial output data provided from the parallel-serial converting register 11 are written into the semiconductor nonvolatile memory 9 in succession.

Numeral 12 designates a revolution sensor. Although not especially restricted, the revolution sensor 12 is constructed of a rotary shaft SH which has magnets MG coupled on its periphery at equal intervals, and a reed switch LS which is arranged in proximity to the rotary shaft SH. The rotary shaft SH is coupled with the output shaft of the transmission of the automobile, and is rotated at the number of revolutions proportional to the number of revolutions of the output shaft. The reed switch LS is driven by the magnets MG.

As shown in the figure, the reed switch LS has one end connected to the ground point of the circuitry and another end connected through a resistor $R_6$ to the output terminal of the voltage regulator 4. Accordingly, a pulse signal at a period proportional to the speed of the automobile is delivered to the other end of the reed switch LS.

Numeral 13 designates a waveform-shaping circuit which provides a pulse signal with a desired level and rise and fall characteristics relative to the pulse signal supplied from the revolution sensor 12. The waveform-shaping circuit 13 is adapted to nullify noise such as pulse noise which is impressed on the output pulse signal of the revolution sensor 12 by the chattering of the reed switch LS and various undesirable electrical couplings between a signal line with the reed switch LS connected thereto and the other wirings. Numeral 14 designates a speed counter which counts the pulses of the pulse signal supplied from the waveform-shaping circuit 13.

The reference pulse signal generator 15 referred to above forms clock pulse signals $\phi$, $\phi_3$ and $\phi_3'$, and is constructed of an oscillator circuit, frequency divider circuits and gate circuits or the like circuits, not shown. The clock pulse signal $\phi$ is supplied to the key off detector 6 as described previously, and its period is determined by the pulse width of the signal which is to be provided from the key-off detector 6. The clock pulse signal $\phi_3$ is supplied to the reset terminal R' of the speed counter 14, and its period is determined by the count period to be set. The clock pulse signal $\phi_3'$ is supplied to the set terminal S of a latch circuit 16 at the succeeding stage, and is provided immediately before the clock pulse signal $\phi_3$ is provided.

The speed counter 14 is reset in such a way that the clock pulse signal $\phi_3$ is generated, in other words, that the clock pulse signal $\phi_3$ goes high, by way of example. The reset state of the speed counter 14 is released in such a way that the clock pulse signal $\phi_3$ is returned to the low level, by way of example. During the count period during which the clock pulse signal $\phi_3$ is low, the speed counter 14 counts the pulses supplied from the waveform-shaping circuit 13. Here, the number of the pulses provided from the revolution sensor 12 during one count period is proportional to the speed of the automobile. Accordingly, data which is set in the speed counter 14 at the end of one count period is proportional to speed. The speed data set in the counter 14 is set into the latch circuit 16 upon the generation of the clock pulse signal $\phi_3'$. The speed counter 14 is reset again by the clock pulse signal $\phi_3$ which is generated after the generation of the clock pulse signal $\phi_3'$. That is, the set data of the speed counter 14 is returned to 0 (zero). The speed counter 14 restarts the counting operation when the clock pulse signal $\phi_3$ is returned to the low level.

Symbol 17a represents an arithmetic circuit for converting the data delivered from the latch circuit 16, into speed data to be displayed. This arithmetic circuit 17a is constructed substantially of fixed data generating circuit and a digital multiplier circuit. The data provided from the latch circuit 16 and fixed data provided from the fixed data generating circuit are supplied to the digital multiplier circuit as multiplicand data and multiplier data, respectively The fixed data to be provided from the fixed data generating circuit has its values determined in advance in accordance with the characteristics of the running mechanism of the automobile as determined by the diameter of the tire, the gear ratio of a differential gear, etc. employed; the driving-shaft revolution number—versus—output pulse number characteristic of the revolution sensor 12; the count period of the counter 14; and the data unit employed. As a result, the arithmetic circuit 17a provides speed data converted into units such as km/h and miles/h.

Symbol 18a represents a display decoder which decodes the speed data signal delivered from the arithmetic circuit 17a, to thereby form signals for driving the respective display segments of a display device 19a. The signal conversion characteristics of the display decoder 18a is determined in accordance with a pattern to be displayed by the display device 19a.

Figure 2:
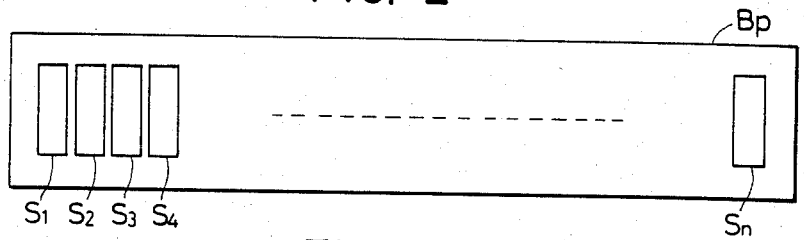
FIGS. 2 and 3 are diagrams of the display patterns of display devices, respectively.

Although not especially restricted, the display device 19a is constructed of a liquid crystal display which includes a plurality of display segment electrodes $S_1$ to $S_n$ rectilinearly arranged and a common electrode BP as shown in FIG. 2.

In this embodiment, the display decoder 18a has the proper conversion characteristic, so that among the display segments $S_1$ to $S_n$, those corresponding to the value of the input speed data are simultaneously driven. As a result, the speed data is displayed as a bar graph pattern.

Numeral 20 denotes an odometric counter which counts the pulses of the pulse signal delivered from the waveform-shaping circuit 13.

The odometric counter 20 has its reset terminal R connected to the output terminal of the key-on detector 5, and is therefore reset only at the closure of the key switch 2. While the key switch 2 is maintained in the "on" state after the initial high level output of the gate A1 established by the time delay of the differentiator formed by C and $R_5$, the output of the key on detector 5 is maintained at a low level, and hence, the odometric counter 20 is held in the reset release state. In this reset release state, the odometric counter 20 counts the pulse signal supplied from the waveform-shaping circuit 13.

Accordingly, the count value of the odometric counter 20 becomes equal to the number of pulses which have been supplied from the circuit 13 since the closure of the key switch 2. In other words, the count content in the odometric counter 20 corresponds to the distance covered by the automobile while the key switch 2 is kept "on".

The output data of the odometric counter 20, and the data set in the serial-parallel converting register 10 during the closure of the key switch 2, in other words, the previous total odometric data having been written in the memory 9 before the closure of the key switch 2, are added by the adder 21. Accordingly, the adder 21 provides the present total odometric data of the automobile.

Numeral 25 designates a display selecting circuit which is disposed as may be needed, and numerals 22 and 23 designate AND gate circuits which are gate-controlled by the circuit 25. The display selecting circuit 25 is controlled by a switch 26 which is disposed on the instrument panel of the automobile.

Either of AND gate circuits 22 and 23 is enabled depending upon the switching state of the switch 26.

As a result, either the odometric data, during the closure of the key switch, delivered from the odometric counter 20 or the total odometric data, which is delivered from the adder 21, is supplied to an OR circuit 24 through one of gates 22 and 23.

Shown at 17b is an arithmetic circuit, which is constructed similarly to the arithmetic circuit 17a. That is, it is constructed substantially of a fixed data generating circuit and a digital multiplier circuit. As in the foregoing, fixed data to be provided from the fixed data generating circuit is properly set in accordance with the characteristics of the running mechanism and the driving-shaft revolution number—versus—output pulse number characteristic. Thus, the arithmetic circuit 17b provides an odometric data converted into such units as km and mile.

Figure 3:
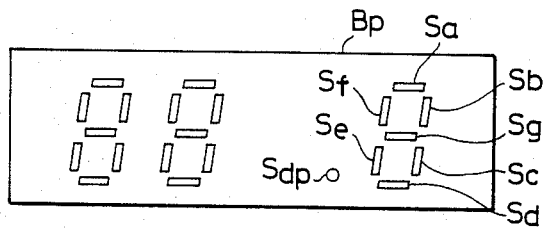

Symbol 18b denotes a display decoder, and symbol 19b denotes a display device. The display device 19b is constructed of a liquid crystal display which has display segments for indicating a plurality of digits of numerals, a decimal-point indicating segment $S_{dp}$ and a common electrode BP as shown by way of example in FIG. 3.

In accordance with the construction of the display device 19b, the display decoder 18b has signal conversion characteristics in which odometric data is displayed by numeral patterns in a plurality of digits.

According to the embodiment, most of the parts of a speed data displaying device and an odometric data memorizing and displaying device conventionally employed can be implemented with electronic circuits. It becomes unnecessary to arrange a comparatively large-sized device, such as a conventional mechanical counter, on the rear surface of a display panel. As a result, the size of the display panel portion can be comparatively small.

Different kinds of data may be displayed with the single display device, with the result that more data can be indicated in spite of the comparatively small-sized display portion.

The power starting circuit 3 is arranged as shown in FIG. 1, and the other circuits shown in the figure are fed through the power starting circuit 3, whereby useless power dissipation of the battery 1 during the "off" state of the key switch 2 is negligible.

The embodiment can be modified or improved variously. By way of example, data such as the odometric data need not always be normally displayed, in contrast to data such as speed data which should desirably be normally displayed during the transit or running of the automobile. Accordingly, the display decoder 18b can be supplied with a display blanking indication signal by, for example, employing an appropriate switch.

The key-on detector 5 shown in FIG. 1 is a mere example. This key-on detector may well be constructed of flip-flop circuits and a gate circuit likewise to the key-off detector 6. In this case, the detection signal is provided from the key on detector 5 after the supply voltages of levels sufficient for the read/write control circuit 8, the odometric counter 20 etc. have been delivered from the voltage regulator 4. As a result, the resetting of the odometric counter 20 and the starting of the read/write control circuit 8 can be executed more reliably.

The data which is provided from the semiconductor nonvolatile memory 9 at the closure of the key switch may well be set into the odometric counter 20 directly or through the serial-parallel converting register 10. In this case, the previous odometric data and the new odometric data are integrated by the odometric counter 20. Accordingly, adder 21, the gate circuits 22 to 24 and the display selecting circuit 25 need not be disposed, and the circuit arrangement can be simplified.

The fixed data generating circuit in each of the arithmetic circuits 17a and 17b can be made programmable by employing, for example, an appropriate switch or an appropriate nonvolatile memory.

In this case, the circuit device of FIG. 1 can set the fixed data at will, so that it can be applied to automobiles of various characteristics. In addition, even where the number of output pulses versus the distance of travel fluctuates due to fluctuation in the tire diameter of the automobile, etc., the fixed data can be properly corrected, so that a more precise odometric data can be displayed.

The device shown in FIG. 1 may be used jointly with the conventional mechanical odometer as is necessary. In this case, the mechanical odometer can be installed at any desired place in the automobile by arranging the illustrated display device 19b on the instrument panel. As a result, even in joint use, the various effects based on the use of the illustrated device are not substantially adversely affected.

Figure 4:
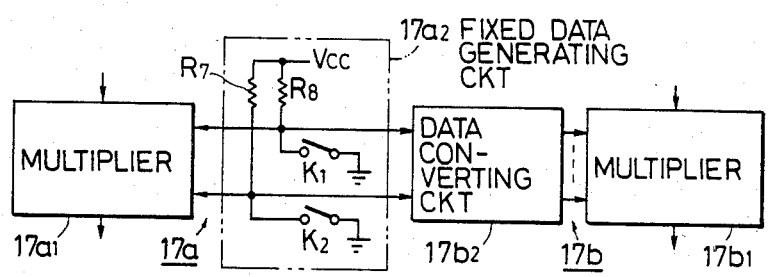
FIGS. 4 and 5 are circuit diagrams of other embodiments, respectively.

FIG. 4 shows an example in which the fixed data generating circuits in the arithmetic circuits 17a and 17b are unitarily constructed. Referring to the figure, the arithmetic circuit 17a is constructed of a multiplier circuit $17a_1$ and a fixed data generating circuit $17a_2$, while the arithmetic circuit 17b is constructed of a multiplier circuit $17b_1$ and a data converting circuit $17b_2$. As shown in the figure, the fixed data generating circuit $17a_2$ is constructed of resistors $R_7$ and $R_8$ and switches $K_1$ and $K_2$. Fixed data to be supplied to the multiplier circuit $17a_1$ is determined by the combination of the switching states of the respective switches $K_1$ and $K_2$.

The fixed data to be supplied to the multiplier circuit $17a_1$ and fixed data to be supplied to the multiplier circuit $17b_1$ can be held at a one-to-one correspondence under the condition that the unit of data to be obtained with the multiplier circuit $17a_1$, the unit of data to be obtained with the multiplier circuit 17$b_1$, and the count period of the speed counter 14 are fixed.

In the example of FIG. 4, accordingly, the data converting circuit 17$b_2$ is essentially constructed of a data converter such as a decoder which is supplied with the output of the fixed data generating circuit 17$a_2$.

In accordance with the arrangement of FIG. 4, fixed data common to the multiplier circuits 17$a_1$ and 17$b_1$ may be set, so that the circuit operation can be simplified.

Figure 5:
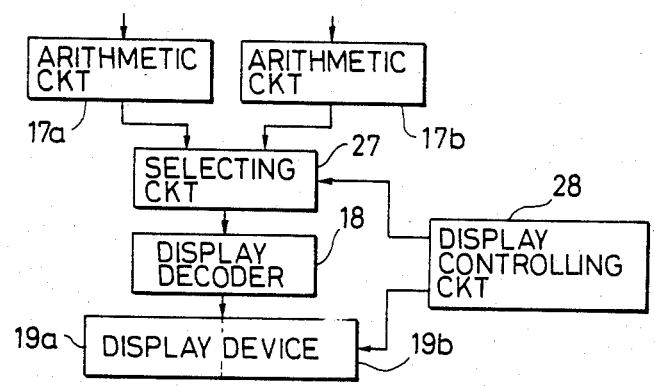

FIG. 5 shows an example in which a traveling speed display device 17a and a traveling distance display device 19b are driven by a common display decoder 18. Referring to the figure, the display decoder 18 is supplied in a time-division fashion with the output data of an arithmetic circuit 17a and 17b through a selecting circuit 27 which is controlled by a display controlling circuit 28. The display devices 19a and 19b are operated in time division fashion by the display controlling circuit 28.

As a result, the output data of the arithmetic circuit 17a is displayed on the display device 19a, and the output data of the arithmetic circuit 17b is displayed on the display device 19b.

Figure 6:
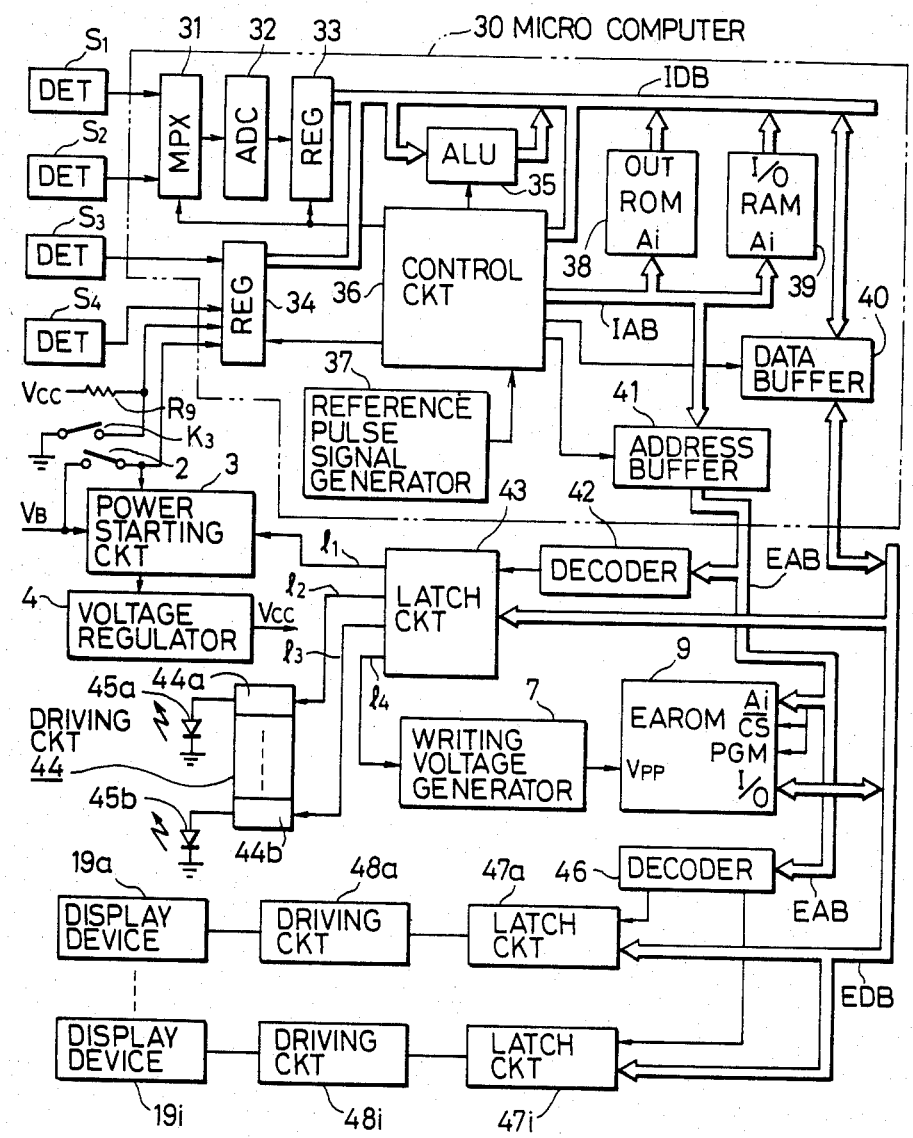
FIG. 6 is a circuit diagram of still another embodiment.

FIG. 6 shows the circuit arrangement of another embodiment of this invention. Referring to the figure, numeral 30 designates a microcomputer. Although not especially restricted it is comprised of an analog multiplexer (MPX) 31, an analog-to-digital converter (ADC) 32, a register (REG) 33, another register (REG) 34, an arithmetic logic unit (ALU) 35, a control circuit 36, a reference pulse signal generator 37, a read only memory (ROM) 38, a random access memory (RAM) 39, a data buffer 40, and an address buffer 41. The ROM 38 stores therein various instructions constituting various programs, and various fixed data.

The memory addresses of the ROM 38 are accessed by address signals which are supplied from the control circuit 36 through address bus lines IAB. Output information from the ROM 38 is supplied to various circuits such as the control circuit 36 and the ALU 35 through data bus lines IDB. The control circuit 36 is constructed of known circuits including a program counter, a stack pointer, general-purpose registers, an instruction decoder and a control pulse signal generator, not shown.

The control circuit 36 provides control signals to be supplied to the various circuits, on the basis of the instructions provided from the ROM 38.

Symbols $S_1$ and $S_2$ represent analog sensor circuits. The analog sensor circuit $S_1$ is constructed, for example, of a thermistor for detecting the temperature of engine cooling water, an appropriate bias circuit for the thermistor, an operational amplifier circuit, etc. Likewise, the analog sensor circuit $S_2$ is constructed, for example, of a thermistor, the coefficient of heat radiation of which is varied by fuel remaining in a fuel tank, a bias circuit which causes the thermistor to self-heat, an operational amplifier circuit, etc. As a result, the analog sensor circuits $S_1$ and $S_2$ provide analog voltages which are respectively proportional to the engine cooling water temperature and the fuel supply.

Symbols $S_3$ and $S_4$ represent digital sensor circuits. By way of example, the digital sensor circuit $S_3$ is constructed of an engine crank angle sensor. The digital sensor circuit $S_3$ provides a pulse signal in correspondence with the specified angle of the engine crank angle, such as 0°.

The digital sensor circuit $S_4$ is constructed of revolution sensor 12 and waveform-shaping circuit 13 as shown in FIG. 1.

In this embodiment, signals which are provided from the analog sensor circuits $S_1$ and $S_2$, the digital sensor circuits $S_3$ and $S_4$ and the key switch 2 are written into the respectively corresponding memory addresses of the RAM 39 in time divisions fashion by the execution of an input program stored in the ROM 38. By way of example, the output signal of the analog sensor circuit $S_1$ is written into the corresponding memory address of the RAM 39 as explained below.

First, the analog multiplexer (MPX) 31 is controlled so that the output signal of the analog sensor circuit $S_1$ may be applied to the analog-to-digital converter (ADC) 32. The output signal from the MPX 31 is converted by the ADC 32 into digital signals, which are stored in the register 33. Subsequently, register 33 is controlled so that the digital signals stored therein may be supplied to the data bus lines IDB.

Subsequently, predetermined address signals and a write control signal are supplied to the RAM 39 through the address bus lines IAB. As a result, the digital signals of the data bus lines IDB are written into the predetermined address of the RAM 39. Likewise, the analog multiplexer 31, the register 33 and the RAM 39 are controlled whereby an analog signal provided from the analog sensor circuit $S_2$ is converted into a digital data, which is written into the corresponding address of the RAM 39.

The respective bits (not shown) of the digital signal receiving register 34 are defined by pulse signals provided from the digital sensor circuits $S_3$ and $S_4$ and the key switch 2 corresponding thereto. The data of the register 34 are similarly written into the corresponding addresses of the RAM 39 through the data bus lines IDB. The input data written in the RAM 39 are utilized in executing the various programs stored in the ROM 38. If necessary, various data formed by executing the various programs are rewritten into the RAM 39.

In order to process the data received from the analog sensor circuits $S_1$ and $S_2$, a data unit altering program is executed. Although not especially restricted, the program for altering the digitized analog data is formed so as to execute interpolation. Accordingly, sampling data which have been determined on the basis of, for example, the temperature - voltage conversion characteristic of the analog sensor circuit $S_1$ are prepared in the ROM 38.

By the execution of the data unit altering program which utilizes the ALU 35, the closest sampling data to the received engine cooling water temperature data in the unit of voltage is referred to, and the sampling data referred to is subsequently interpolated with the received engine cooling water temperature data. As a result, an engine cooling water temperature data in the unit of, for example, Celsius degrees corresponding to the received engine cooling water temperature data, is formed and is written into the RAM 39. Likewise, fuel supply data in terms of percentage of a full tank is formed on the basis of the received fuel supply data.

A display decode program prepared in the ROM 38 in case of necessity is executed. As a result, segment data for driving the display segments of a display device to be described later are formed on the basis of the engine cooling water temperature data converted as described above and are written into the RAM 39. Similar segment data are formed on the basis of the fuel reserve data.

An abnormality in the engine cooling water temperature is tested by an alarm program. When an overheating state of the engine has thus been detected, overheating indicating data is set at a predetermined bit of a predetermined address in the RAM 39. Similarly, when the fuel reserve has lowered down to a predetermined value, fuel warning data is set.

The crank angle pulse signal provided from the digital sensor circuit $S_3$ is regarded as engine revolution number data. The pulse signal provided from the digital sensor circuit $S_4$ is regarded as speed and odometric data as in the foregoing embodiment. These pulse signal provided from the digital sensor circuits are counted and written into the corresponding addresses of the RAM 39 by a pulse counting program.

By way of example, that bit in the predetermined address of the RAM 39 which corresponds to the digital sensor circuit $S_3$ is checked by the counting program. If the bit has been changed as from "0" to "1", "1" is added to the address of the RAM 39 to be used for a counter, in other words, a counter address. A clock pulse signal is supplied from the reference pulse signal generator 37, whereby data in the counter address is written into the address of the RAM 39 to be used as an engine revolution number-memory address, whereupon the data in the counter address is cleared. Accordingly, data which is equal to the number of crank angle pulses generated in one period of the clock pulse signal is set in the engine revolution number-memory address.

Likewise, that bit of the RAM 39 which corresponds to the digital sensor circuit $S_4$ is checked, whereby speed data is formed and written into the RAM 39. The speed data is added to data in a trip odometry-memory address and a data in a total odometry-memory address which have been set in the RAM 39 in advance, whereby trip odometric data and total odometric data are respectively formed.

The data in the engine revolution number-memory address, the speed data, the trip odometric data and the total odometric data are respectively converted into data in units r.p.m., in km/h, in km and in km by the conversion program described above. The converted data are respectively converted into display segment data.

As illustrated in FIG. 6, peripheral devices to be described below are coupled to the microcomputer 30. Numeral 42 designates a decoder which receives an output from the address buffer 41 through address bus line EAB. Numeral 43 designates a latch circuit which receives output signals from the decoder 42 as a set indicating signal and which receives a data signal from the data buffer 40 through data bus lines EDB. Numeral 3 designates a power starting circuit which receives signals provided from the key switch 2 and the latch circuit 43. This power starting circuit has, for example, an arrangement equivalent to the embodiment of FIG. 1 from which the flip-flop circuit RSF and the delay circuit DLY have been removed. Numeral 4 designates a voltage regulator which receives a battery voltage through the power starting circuit 3 and which serves to feed a supply voltage to the various illustrated circuits. Numeral 44 designates a driver circuit which receives output signals from the latch circuit 43 and which drives light emitting elements to be stated below. Symbols 45a to 45b represent the light emitting elements which are constructed of light emitting diodes or the likes. Numeral 7 demotes a writing voltage generator which receives an output signal from the latch circuit 43.

Numeral 9 denotes a semiconductor nonvolatile memory which receives an output of the writing voltage generator 7 at a writing voltage input terminal $V_{PP}$ thereof and which receives the various signals supplied from the address bus lines EAB at address input terminals $A_i$, a chip select terminal $\overline{CS}$ and a program terminal PGM thereof. As shown in the figure, the semiconductor nonvolatile memory 9 has its data input/output terminal I/0 coupled with the data bus lines EDB. Numeral 46 denotes a decoder which receives signals through the address bus lines EAB. Symbols 47a to 47i represent latch circuits which receive signals provided from the decoder 46, as set indicating signals and receive signals supplied through the data bus lines EDB, as input data signals, respectively. Symbols 48a to 48i represent driver circuits which receive output signals of the latch circuits, respectively. Symbols 19a to 19i represent liquid crystal displays which are driven by output signals of the driver circuits 48a to 48i, respectively.

In the embodiment of FIG. 6, upon closure of the key switch 2, the power starting circuit 3 is started and the supply voltage is provided from the voltage regulator 4. As a result, the illustrated circuits including the microcomputer 30 are enabled. The closed state of the key switch 2 is detected by a power control program of the microcomputer 30. The power control program sets in the latch circuit 43 data which brings the level of a line $l_1$ coupled to the power starting circuit 3 to, for example, a low level. Upon the detection of the closure of the key switch by the power control program, an initial state set program in the microcomputer 30 is started. As a result, the total odometric data of the automobile having been stored in the semiconductor nonvolatile memory 9 is written into a predetermined address of the RAM 39 through the data bus lines EDB, the data buffer 40 and the data bus lines IDB. Initial data such as 0 (zero) is written into another predetermined address of the RAM 39.

After the initial state set program has been executed, the various programs mentioned above are executed, and a program for writing the segment data, the display data etc. into the latch circuits 43 and 47a to 47i is executed. As a result, the speed of the automobile, the trip distance covered or total distance covered, the engine cooling water temperature, the engine revolution number, etc. are displayed as bar graph patterns or the like analog patterns or as Arabic numeral patterns or the like digital patterns by the display devices 19a to 19i.

The abnormal overheating state of the engine, the shortage of fuel, etc. are displayed by the light emitting elements 45a to 45b in such a way that data which bring the levels of lines $l_2$ and $l_3$ into, for example, the high level are set in the latch circuit 43.

Where the key switch 2 has been opened, the opened stated is detected by the power control program. Thus, a data writing program is started. By the data writing program, data which brings the level of a line $l_4$ into the high level is set in the latch circuit 43, and a writing voltage of, for example, +25 volts is provided from the writing voltage generator 7. The total odometric data is read out from the predetermined address of the RAM 39, and is supplied to the data input/output terminal I/0 of the semiconductor nonvolatile memory 9 through the data bus lines IDB, the data buffer 40 and the data bus lines EDB. The predetermined address signals, chip select signal and program signal are supplied from the control circuit 36 to the semiconductor nonvolatile memory 9 through the address lines IAB, the address buffer 41 and the address bus lines EAB. As a result, renewed total odometric data is written into the semiconductor nonvolatile memory 9.

After the execution of the data writing program has been completed, data which brings the level of the line $l_1$ into the high level is set in the latch circuit 43 by the power control program. As a result, the power feed to the illustrated circuits by the power starting circuit 3 is stopped.

FIG. 6, a part $K_3$ is a switch which is arranged on the instrument panel of the automobile. The switch $K_3$ can be used for, e.g., the appointment of the selection of the display data. According to the arrangement of FIG. 6, most of an automobile condition monitor can be implemented as electronic circuits.

The embodiment of FIG. 6 can have its arrangement or operation modified or improved. For example, the reference data which are used in converting the data provided from the sensor circuits $S_1$ to $S_4$ as described above may well be written into the semiconductor nonvolatile memory 9 by utilizing a switch similar to the switch $K_3$, instead of being written in the ROM 38 in advance. In this case, the reference data can be readily changed, so that various sensor circuits of different arrangements can be employed. It is therefore possible to use the circuit device of FIG. 6 for automobiles of various constructions in common. As in the foregoing, corrections for providing preciser data become possible.

In the semiconductor nonvolatile memory 9, control data which indicate the trip odometric data and the appointment of the preparation of this trip odometric data may well be further written by a designation from a switch like the switch $K_3$. In this case, unlike the embodiment of FIG. 1, the trip odometric data in a range designated by an operator such as the driver of the automobile can be displayed irrespective of the repetition of the turning-on and -off of the key switch 2.

Monitor data such as an odometric data considered for the inspection and maintenance of the automobile can also be written into the semiconductor nonvolatile memory 9 by similarly utilizing a switch like the switch $K_3$. In this case, the display of a future time of maintenance, the warning display that the time of maintenance has come, etc. can be made by writing a desired monitor program in the ROM 38 in advance.

As the automobile monitor, the analog multiplexer 31 in FIG. 6 may well be supplied with the battery voltage through the power starting circuit 3 and a voltage dropping circuit such as a resistance type potential divider. In this case, a warning can be given of the abnormal lowering of the battery voltage by preparing a battery voltage detecting program.

The present invention is not restricted to the foregoing embodiments. For example, the electrically erasable nonvolatile semiconductor memory as explained above, namely, the EAROM (Electrically Alterable Read Only Memory) or EEROM (Electrically Erasable Read Only Memory) can be replaced with a nonvolatile semiconductor memory employing memory elements such as FAMOS (Floating Gate Avalanche Injection MOS) elements, namely, an EPROM (Electrically Programmable Read Only Memory). In this case, the data of the memory can be erased by suitable irradiation as with ultraviolet light, as is well known. Accordingly, the memory is coupled with an appropriate data erasing radiation source which is controlled by the key switch. Further, if necessary, a nonvolatile memory such as a fuse ROM can be used.

The revolution sensor may well be altered to any of various constructions including a construction which employs an electric coil and a construction which utilizes an electric capacitance variation, in lieu of the foregoing construction which employs the reed switch.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed is:

1. For use in a processor-based control system associated with a vehicle, said vehicle having sensors generating signals representative of prescribed conditions of the vehicle, a data handling system comprising:
   an electrically erasable and programmable read only memory;
   means, coupled to said electrically erasable and programmable read only memory and said sensors, for generating data indicative of a condition of said vehicle in response to signals generated by said sensors and causing said data to be written into said electrically erasable and programmable read only memory;
   a control switch, the operation of which governs the operation of said data handling system, wherein said means for generating data comprises means for causing said data to be written into said memory in response to the turning-off of said control switch;
   switching means for controlling the supply of power for said electrically erasable and programmable read only memory; and
   control means, coupled to said switch means and responsive to the operation of said control switch, for causing said switching means to supply power to said electrically erasable and programmable read only memory for a prescribed period of time subsequent to the turning-off of said control switch after which prescribed period of time the supply of power to said memory is cut off.

2. A system according to claim 1, wherein said means comprises means, responsive to the turning-on of said control switch, for generating data indicative of a condition of the vehicle on the basis of signals generated by said sensors and data stored in said electrically erasable and programmable read only memory.

3. A system according to claim 1, wherein said sensors include sensor means for generating signals representative of the travel distance of said vehicle and said means includes means for generating data representative of the total travel distance of said vehicle in response to the turning-off of said control switch.

4. A system according to claim 1, wherein said data writing causing means comprises means, responsive to the turning-off of said control switch for causing a portion of said data to be written into those memory addresses the contents of which provided a basis for the generation of said data in response to the turning-on of said control switch.

5. A system according to one of claims 1 and 2, further comprising display means, coupled to said data generation means, for displaying prescribed information in accordance with the data generated by said data generation means.

6. A system according to claim 1, wherein said vehicle includes sensor means generating signals representative of preselected operational conditions of the vehicle and wherein said data handling system further comprises additional memory; and means, coupled to said sensor means, for generating further data representative of said preselected operational conditions of the engine and causing said further data to be written into said additional memory.

7. A system according to claim 6, wherein said further data writing causing means includes means, coupled to said memory, for causing prescribed data stored in said electrically erasable and programmable read only memory to be written into said additional memory.

8. A system according to claim 11, further comprising display means, coupled to said additional memory, for displaying prescribed information in accordance with the data stored therein.

9. A system according to claim 8, wherein said prescribed data is representative of the travel distance of said vehicle.

10. A system according to claim 9, wherein said preselected operational conditions correspond to a condition of fuel remaining in a fuel tank.

* * * * *